United States Patent
Lee et al.

(10) Patent No.: US 10,750,512 B2
(45) Date of Patent: Aug. 18, 2020

(54) METHOD FOR TRANSRECEIVING V2X SIGNAL OF TERMINAL IN WIRELESS COMMUNICATION SYSTEM, AND TERMINAL USING THE METHOD

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 122 days.

(21) Appl. No.: 15/754,582

(22) PCT Filed: Aug. 24, 2016

(86) PCT No.: PCT/KR2016/009398
§ 371 (c)(1),
(2) Date: Feb. 22, 2018

(87) PCT Pub. No.: WO2017/034324
PCT Pub. Date: Mar. 2, 2017

(65) Prior Publication Data
US 2018/0242302 A1  Aug. 23, 2018

Related U.S. Application Data

(60) Provisional application No. 62/209,307, filed on Aug. 24, 2015.

(51) Int. Cl.
*H04W 72/04* (2009.01)
*H04W 4/40* (2018.01)
(Continued)

(52) U.S. Cl.
CPC ......... *H04W 72/048* (2013.01); *H04L 5/0069* (2013.01); *H04L 5/0094* (2013.01);
(Continued)

(58) Field of Classification Search
None
See application file for complete search history.

(56) References Cited

U.S. PATENT DOCUMENTS

2004/0106407 A1* 6/2004 Kikuma ............... H04W 36/22
455/436
2013/0159407 A1  6/2013 Koskela et al.
(Continued)

FOREIGN PATENT DOCUMENTS

CN  104717718  6/2015
CN  104936260  9/2015
(Continued)

OTHER PUBLICATIONS

JP2003289577A google machine translation. (Year: 2003).*
(Continued)

*Primary Examiner* — Kenny S Lin
(74) *Attorney, Agent, or Firm* — Lee Hong Degerman Kang Waimey

(57) ABSTRACT

Provided are a method for transreceiving a vehicle-to-everything (V2X) signal of a terminal in a wireless communication system, and a terminal apparatus using the method. The method comprises: transreceiving a V2X control signal through a first carrier commonly configured to a first area and a second area; and transreceiving V2X data through a second carrier configured to the first area or a third carrier configured to the second area.

14 Claims, 16 Drawing Sheets

(51) Int. Cl.
*H04W 72/12* (2009.01)
*H04W 72/10* (2009.01)
*H04W 28/02* (2009.01)
*H04L 5/00* (2006.01)

(52) U.S. Cl.
CPC ............ *H04W 4/40* (2018.02); *H04W 28/02* (2013.01); *H04W 72/04* (2013.01); *H04W 72/0453* (2013.01); *H04W 72/10* (2013.01); *H04W 72/12* (2013.01); *H04L 5/0007* (2013.01)

(56) References Cited

U.S. PATENT DOCUMENTS

| | | | |
|---|---|---|---|
| 2014/0247802 A1 | 9/2014 | Wijting et al. | |
| 2014/0308954 A1 | 10/2014 | Wang et al. | |
| 2014/0355557 A1 | 12/2014 | Peng et al. | |
| 2015/0043446 A1 | 2/2015 | Tsirtsis et al. | |
| 2015/0172956 A1* | 6/2015 | Noh | H04W 74/0858 370/329 |
| 2016/0021008 A1* | 1/2016 | Park | H04W 28/02 370/229 |
| 2016/0061614 A1* | 3/2016 | Lee | G01S 19/07 701/446 |
| 2016/0087804 A1* | 3/2016 | Park | H04L 67/12 713/156 |
| 2017/0171690 A1* | 6/2017 | Kim | H04L 67/125 |
| 2017/0280471 A1* | 9/2017 | Lee | H04W 72/12 |
| 2018/0359707 A1* | 12/2018 | Chae | H04W 52/10 |
| 2019/0182806 A1* | 6/2019 | Chae | H04L 5/003 |

FOREIGN PATENT DOCUMENTS

| | | |
|---|---|---|
| EP | 2858435 | 4/2015 |
| JP | 2003284115 | 10/2003 |
| JP | 2003289577 | 10/2003 |
| JP | 2004153759 | 5/2004 |
| JP | 2013527652 | 6/2013 |
| JP | 2013172345 | 9/2013 |
| KR | 1020120048963 | 5/2012 |

OTHER PUBLICATIONS

JP2013172345A google machine translation (Year: 2013).*
Japan Patent Office Application No. 2018-510381, Office Action dated Jan. 8, 2019, 4 pages.
European Patent Office Application Serial No. 16839613.3, Search Report dated Feb. 21, 2019, 9 pages.
NEC, "Deployment scenarios of LTE-based V2X", 3GPP TSG RAN WG1 Meeting #82, R1-154194, Aug. 2015, 5 pages.
Nokia, et al., "Resource pool for out of coverage UE", 3GPP TSG RAN WG2 Meeting #90, R2-152054, May 2015, 2 pages.
NEC, "Deployment scenarios of LTE-based V2X," 3GPP TSG-RAN WG1 #82, R1-154194, Aug. 2015, 7 pages.
PCT International Application No. PCT/KR2016/009398, Written Opinion of the International Searching Authority dated Nov. 18, 2016, 4 pages.

* cited by examiner

METHOD FOR TRANSRECEIVING V2X SIGNAL OF TERMINAL IN WIRELESS COMMUNICATION SYSTEM, AND TERMINAL USING THE METHOD

CROSS-REFERENCE TO RELATED APPLICATIONS

This application is the National Stage filing under 35 U.S.C. 371 of International Application No. PCT/KR2016/009398, filed on Aug. 24, 2016, which claims the benefit of U.S. Provisional Application No. 62/209,307, filed on Aug. 24, 2015, the contents of which are all hereby incorporated by reference herein in its entirety.

BACKGROUND OF THE INVENTION

Field of the Invention

The present invention relates to wireless communication, and more particularly, to a method of transmitting/receiving a vehicle-to-everything (V2X) signal of a terminal in a wireless communication system, and the terminal using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, $3^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, the D2D operation may also apply to vehicle-to-everything (V2X). The V2X collectively refers to communication techniques using a vehicle and all interfaces. A type of the V2X may be various such as vehicle-to-vehicle (V2V), vehicle-to-infrastructure (V2I), vehicle-to-person (V2P), vehicle-to-network (V2N), or the like.

The V2X communication may be performed in a single carrier, and may be performed in a plurality of carriers. In addition, a plurality of carriers different from each other may be configured for V2X communication in adjacent regions. In this case, if a user equipment (UE) enters a second region while performing V2X communication in a first region, since a configured carrier changes, it may be necessary to switch a transmission (TX) chain or reception (RX) chain of a signal to transmit/receive the signal on the carrier. A certain period of time is required for switching of the signal TX/RX chain (or carrier switching), which may lead to a problem in continuity of V2X communication.

In addition, it may be ineffective to allow a UE located in proximity to a boundary of the first region and the second region to perform V2X communication by using only a carrier configured in the first region, for example, for a reason that it is located in the first region. For example, it may be ineffective to use only a carrier of the first region despite that the carrier of the first region is significantly congested or frequently collides.

There is a need for a method and apparatus capable of effectively transmitting/receiving a V2X signal in a multiple-carrier environment.

SUMMARY OF THE INVENTION

The present invention provides a method of transmitting/receiving a vehicle-to-everything (V2X) signal of a terminal in a wireless communication system, and the terminal using the method.

In one aspect, provided is a method of transmitting/receiving a vehicle-to-everything (V2X) signal of a terminal in a wireless communication system. The method includes transmitting/receiving a V2X control signal through a first carrier configured commonly in a first region and a second region and transmitting/receiving V2X data through a second carrier configured in the first region and a third carrier configured in the second region.

The first region and the second region may be adjacent different geographical regions.

The first carrier may be a carrier configured to allow both the V2X control signal TX/RX and the V2X data TX/RX.

Each of the second carrier and the third carrier may be a carrier configured to allow only the V2X data TX/RX.

The terminal may be a terminal located at a boundary of the first region and the second region.

The terminal may be a limited capability terminal having a smaller number of TX chains or RX chains than the number of carriers configured in the first region and the second region.

If the terminal receives a message configured to simultaneously transmit V2X signals through the first carrier and the third carrier, the V2X signal may be transmitted through the first carrier and thereafter the TX chain changes, and the V2X signal is transmitted through the third carrier.

If the terminal receives a message configured to simultaneously receive V2X signals through the first carrier and the third carrier, the V2X signal may be received through the first carrier and thereafter the RX chain changes, and the V2X signal is received through the third carrier.

If complexity of a carrier on which the terminal performs a V2X signal TX operation is greater than or equal to a threshold, the terminal may receive a message for instructing to perform the V2X signal TX operation on a different carrier.

Upon receiving the message, the terminal may perform the V2X signal TX operation on the different carrier.

Upon detecting that a different terminal is transmitting a V2X signal, which has a higher priority than the V2X signal of the specific carrier, on the different carrier while the terminal is receiving the V2X signal in a specific carrier, a V2X signal having a higher priority may be received on the different carrier after RX chain switching.

In another aspect, provided is a terminal for transmitting and receiving a vehicle-to-everything (V2X) signal. The terminal includes a radio frequency (RF) unit transmitting and receiving a radio signal and a processor operably coupled to the RF unit. The processor is configured to: transmit/receive a V2X control signal through a first carrier configured commonly in a first region and a second region and transmit/receive V2X data through a second carrier configured in the first region and a third carrier configured in the second region.

A carrier capable of transmitting/receiving a V2X control signal in two adjacent regions is shared, and a carrier capable of transmitting/receiving V2X data is independently configured. Therefore, continuity of V2X communication can be guaranteed even if a terminal moves between the two regions. In addition, performance of V2X communication can be improved since a carrier of a second region can be used instead of a carrier of a first region in which congestion is high or collision occurs frequently.

DESCRIPTION OF EXEMPLARY EMBODIMENTS

Figure 1:
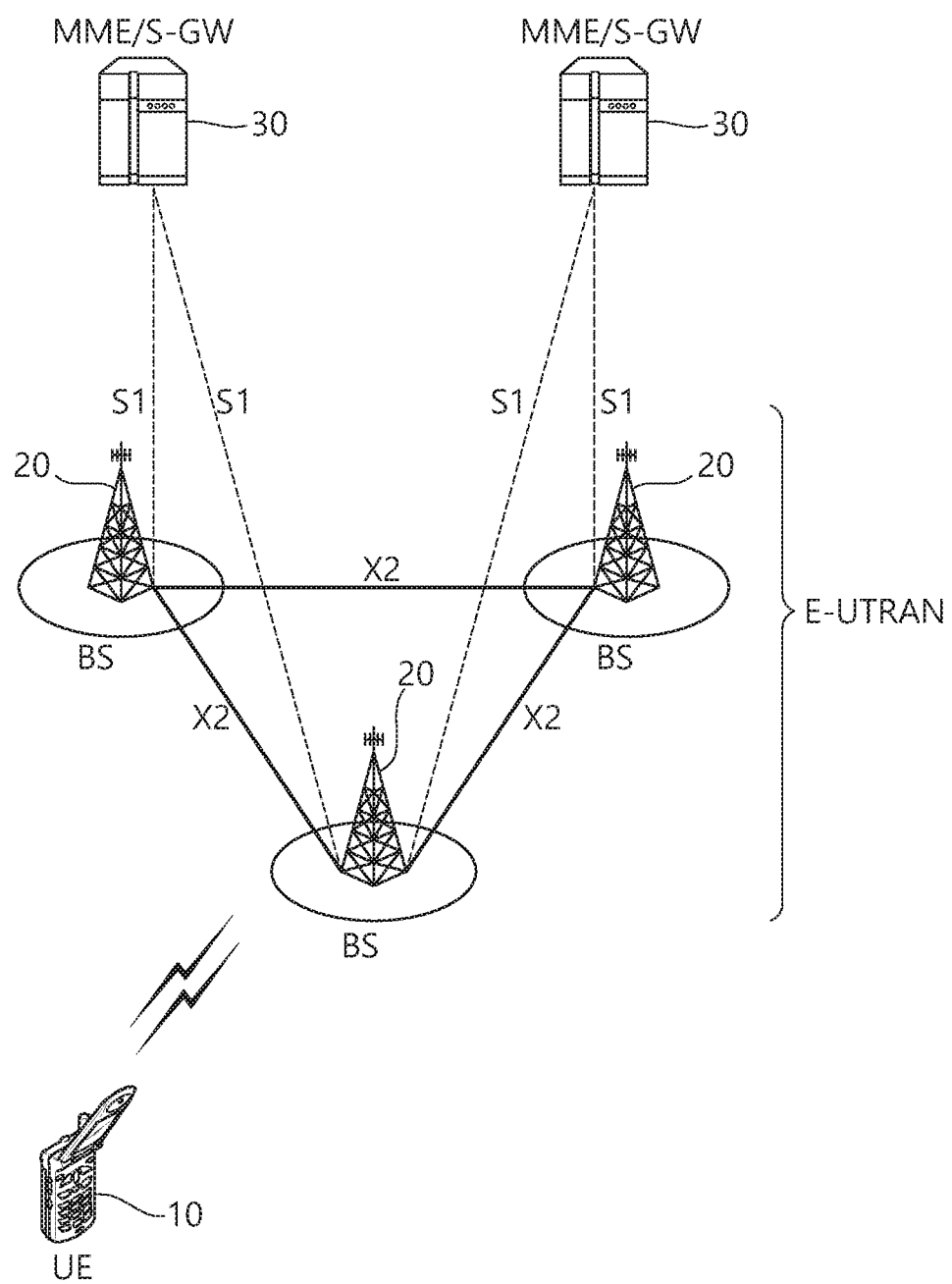
FIG. 1 shows a wireless communication system to which the present invention is applied.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
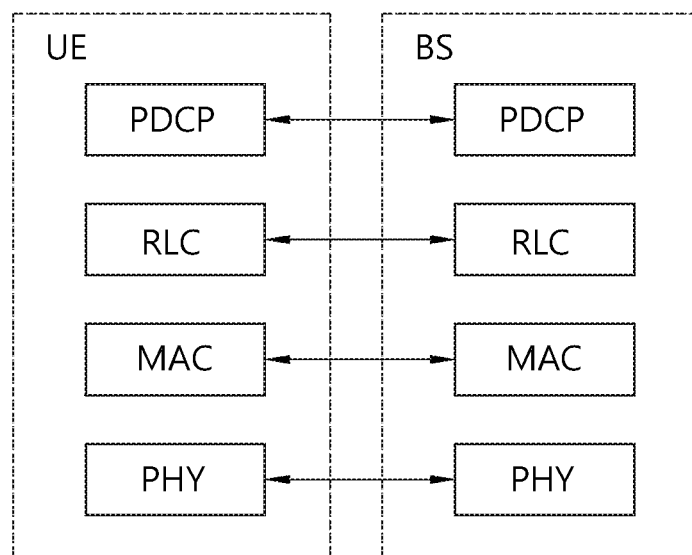
FIG. 2 is a diagram showing a wireless protocol architecture for a user plane.
Figure 3:
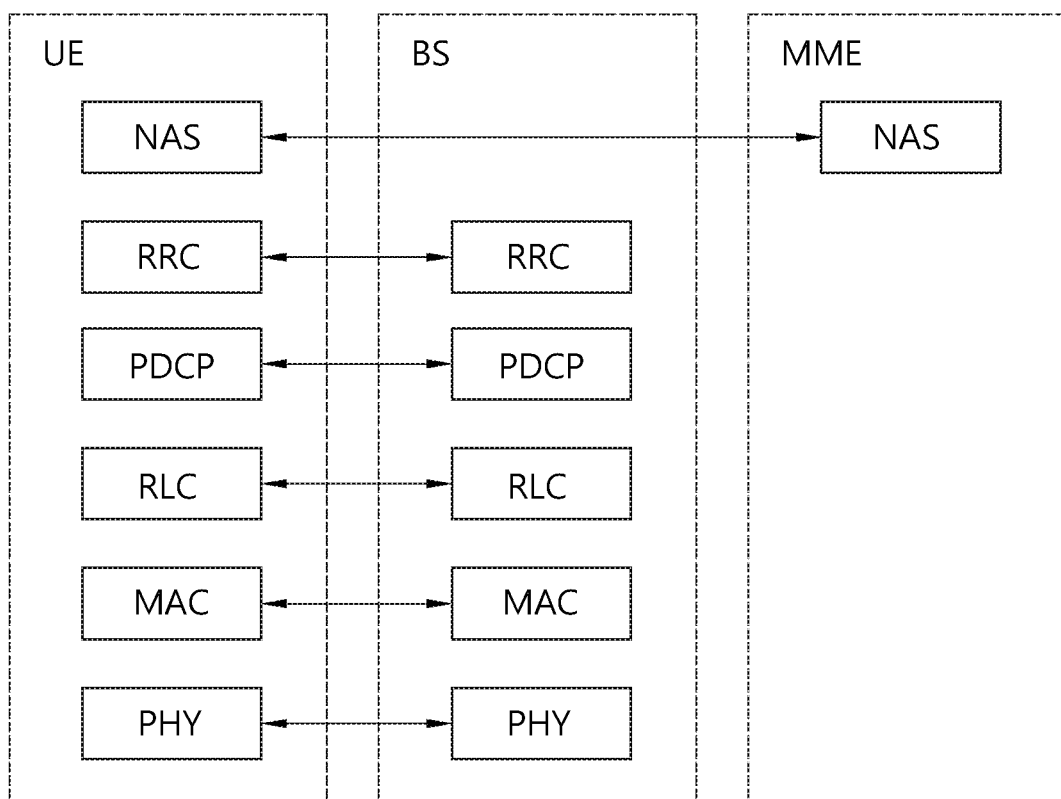
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

The D2D operation will now be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
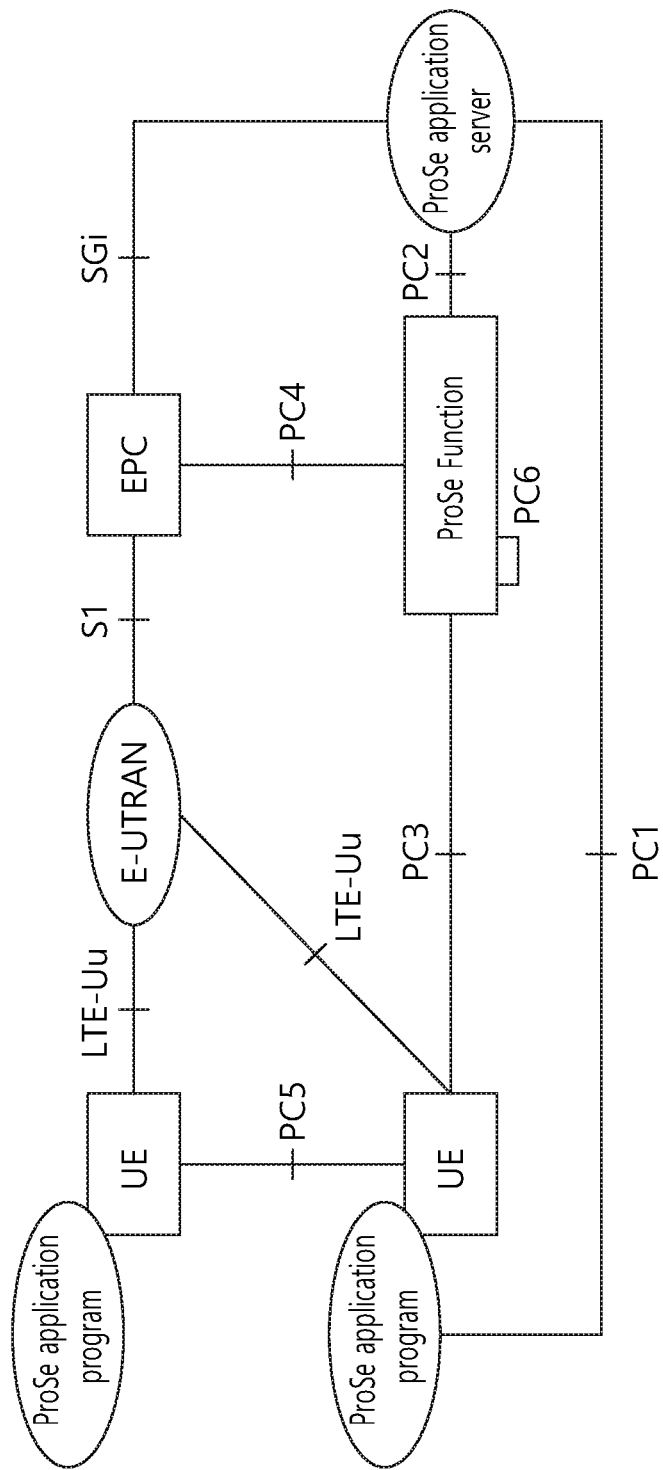
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

The D2D operation may be supported both when UE is serviced within the coverage of a network (cell) or when it is out of coverage of the network.

Figure 5:
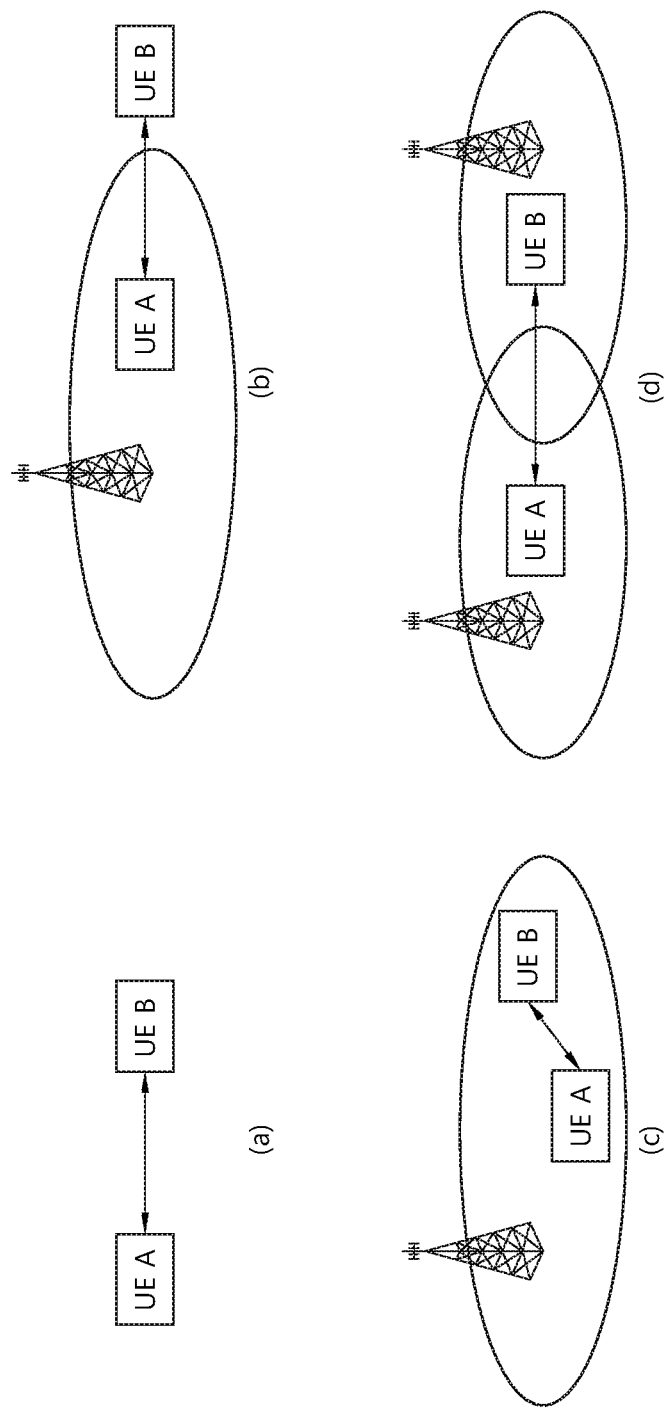
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell.

ProSe direct communication may be performed between types of UE placed at various positions as in FIG. 5.

<Radio Resource Allocation for D2D Communication (ProSe Direct Communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

D2D discovery refers to the procedure used in a ProSe capable terminal discovering other ProSe capable terminals in close proximity thereto and may be referred to as ProSe direct discovery. The information used for ProSe direct discovery is hereinafter referred to as discovery information.

A PC 5 interface may be used for D2D discovery. The PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC CONNECTED state.

Now, the present invention is described.

Hereinafter, methods of efficiently transmitting/receiving a vehicle-to-everything (V2X) control/data message on a plurality of carriers are proposed. The plurality of carriers may be predetermined or may be signaled to a UE. V2X may use the aforementioned D2D operation in terms of UE-to-UE communication.

First, in V2X, 'X' may mean a pedestrian. In this case, V2X may be represented as V2P, and may mean communication between a vehicle (or a device installed in the device) and a device carried by the pedestrian. Herein, the pedestrian is not necessarily limited to a person walking on the road, and may include a person riding a bicycle and a driver or passenger of a vehicle (below a specific speed).

Alternatively, in V2X, 'X' may mean a vehicle. In this case, V2X may be represented as V2V, and may mean communication between vehicles. Alternatively, 'X' may be an infrastructure/network. In this case, V2X may be represented as V2I or V2N, and may mean communication between a vehicle and a roadside unit (RSU) or between the vehicle and the network. The RSU may be a transportation infrastructure, for example, a device for speed notifications. The RSU may be implemented in a base station (BS) or a fixed UE or the like.

Hereinafter, for convenience of explanation, a V2P communication-related device carried by a pedestrian (or a person) is referred to as a 'P-UE', and a V2X communication-related device installed in a vehicle is referred to as a 'V-UE'. In the present invention, the term 'entity' may be interpreted as at least one of a P-UE, a V-UE, an RSU, a network, and an infrastructure.

In the present invention, a 'carrier/cell' may be interpreted as a 'resource pool' predetermined or signaled for the purpose of V2X control/data message transmission (TX) and/or reception (RX).

In order to mitigate a decrease in reliability related to the V2X control/data message RX/TX due to a V2X control/data message collision/congestion or the like, a carrier/cell related to the V2X control/data message TX/RX may be configured differently for each predefined or signaled 'region'.

Herein, the 'region' may be interpreted as at least one of: (1) a geographically separated region; and (2) a region separated by communication coverage of a V2V entity (e.g., a BS(/UE)-type RSU).

Hereinafter, for convenience of explanation, the two regions are referred to as a region#A and a region#B, and it is assumed that the region#A and the region#B are adjacent to each other. Under this circumstance, the carrier/cell related to the V2X control/data message TX/RX for each region may be configured as follows.

It is assumed that the carrier/cell related to the V2X control/data message TX/RX includes a primary carrier(/cell)#A (represented as P-carrier(/cell)#A), a secondary carrier(/cell)#B (represented as a S-carrier(/cell)#B), a S-carrier (/cell)#C, and a S-carrier(/cell)#D.

(Rule#A) The P-carrier(/cell)#A may be commonly configured for the purpose of V2X control/data message TX/RX in the adjacent regions, i.e., the region#A and the region#B.

On the other hand, the S-carrier(/cell)#B and the S-carrier (/cell)#C may be independently configured for the purpose of V2X data/control message TX/RX in the region#A and the region#B. This may be interpreted that some carriers/ cells related to the V2X control/data message TX/RX may be configured independently (or differently) between different (or adjacent) regions.

It may be configured such that both the 'V2X control message TX/RX' and the 'V2X data message TX/RX' are allowed on the P-carrier(/cell)#A, and it may be configured such that only the 'V2X data message TX/RX' is allowed on the S-carrier(/cell)#B and the S-carrier(/cell)#C. For example, a V2X control message transmitted/received on the P-carrier(/cell) may inform scheduling information for a V2X data message transmitted/received on the S-carrier(/cell).

Figure 6:
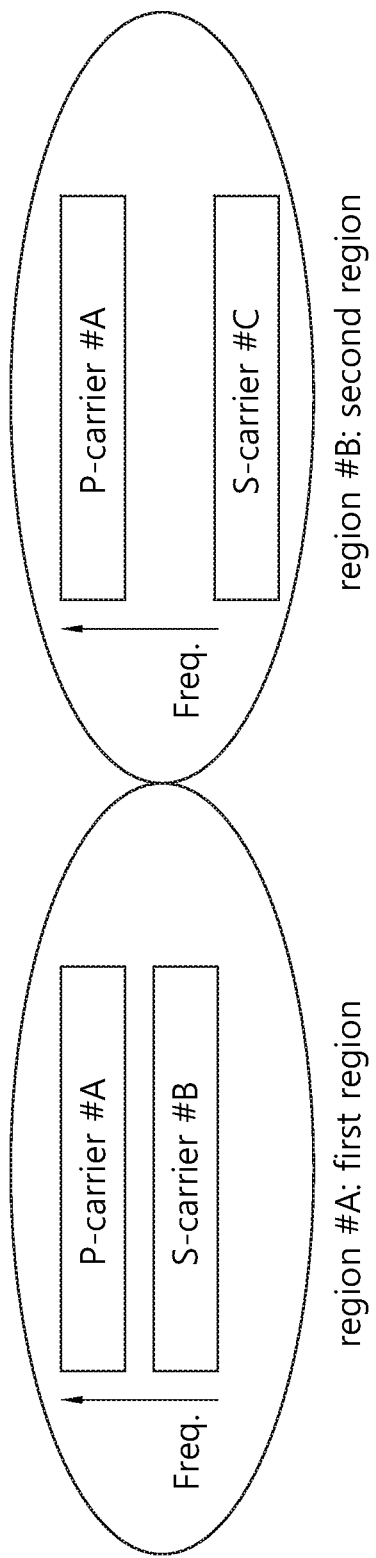
FIG. 6 illustrates a configuration of a carrier for each region according to the rule#A.

FIG. 6 illustrates a configuration of a carrier for each region according to the rule#A.

Referring to FIG. 6, the P-carrier#A and the S-carrier#B may be configured in the region#A. The P-carrier#A and the S-carrier#C may be configured in the region#B. As described above, it may be configured such that TX/RX of both the V2X control signal and the V2X data is allowed on the P-carrier#A, and TX/RX of only the V2X data is allowed on the S-carrier#B and the S-carrier#C. The P-carrier#A, the S-carrier#B, and the S-carrier#C may be carriers of different bands. Although it is represented as a carrier in FIG. 6 for convenience of explanation, the carrier may also be represented as a cell.

Figure 7:
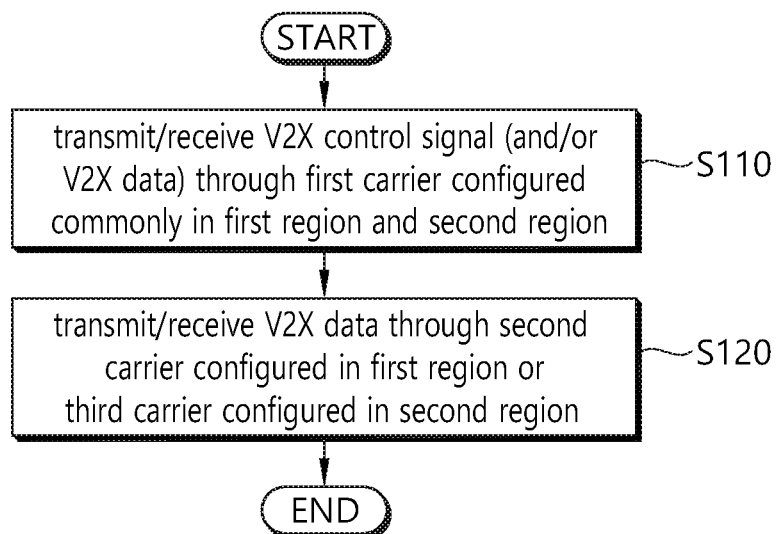
FIG. 7 shows a method of transmitting/receiving a V2X signal of a UE according to an embodiment of the present invention.

FIG. 7 shows a method of transmitting/receiving a V2X signal of a UE according to an embodiment of the present invention.

Referring to FIG. 7, the UE transmits/receives a V2X control signal (and/or V2X data) through a first carrier commonly configured in first and second regions (S110).

In addition, the UE transmits/receives the V2X data through a second carrier configured in the first region or a third carrier configured in the second region (S120).

When the above method is applied to the example of FIG. 6, the UE may transmits/receives the V2X control signal (and/or V2X data) through a carrier, i.e., the P-carrier#A, commonly configured in the region#A and the region#B, and may transmit/receive V2X data through the S-carrier#B configured in the region#A and the S-carrier#C configured in the region#B.

When the rule#A is applied, a V2X entity, e.g., a V-UE or a P-UE, monitors the P-carrier(/cell)#A either 'periodically according to a predefined or signaled period value' or 'preferentially', thereby efficiently continuing V2X communications related to a different (or adjacent) region even when it is located at a boundary of the different (or adjacent) region or passes the boundary of the different (or adjacent) region.

(Rule#B) The P-carrier(/cell)#A and the S-carrier(/cell)#B may be configured in the region#A for the purpose of the V2X control(/data) message TX(/RX), and the S-carrier (kell)#C and the S-carrier(/cell)#C may be configured in the region#B for the purpose of the V2X control(/data) message TX(/RX). That is, it may be interpreted that all carriers/cells related to the V2X control/data message TX/RX are configured independently (or differently) between different (or adjacent) regions. For example, it may be configured such that both the 'V2X control message TX/RX' and the 'V2X data message TX/RX' are allowed on the P-carrier(/cell)#A (region#A) and the S-carrier(/cell)#B, and only the 'V2X data message TX/RX' is allowed on the S-carrier(/cell)#B (region#A) and the S-carrier(kell)#D (region#B).

For example, the V2X control message transmitted/received on the P-carrier(/cell)#A and the S-carrier(/cell)#C may inform scheduling information regarding the V2X data message transmitted/received from the S-carrier(/cell)#B and the S-carrier(/cell)#D, respectively.

Figure 8:
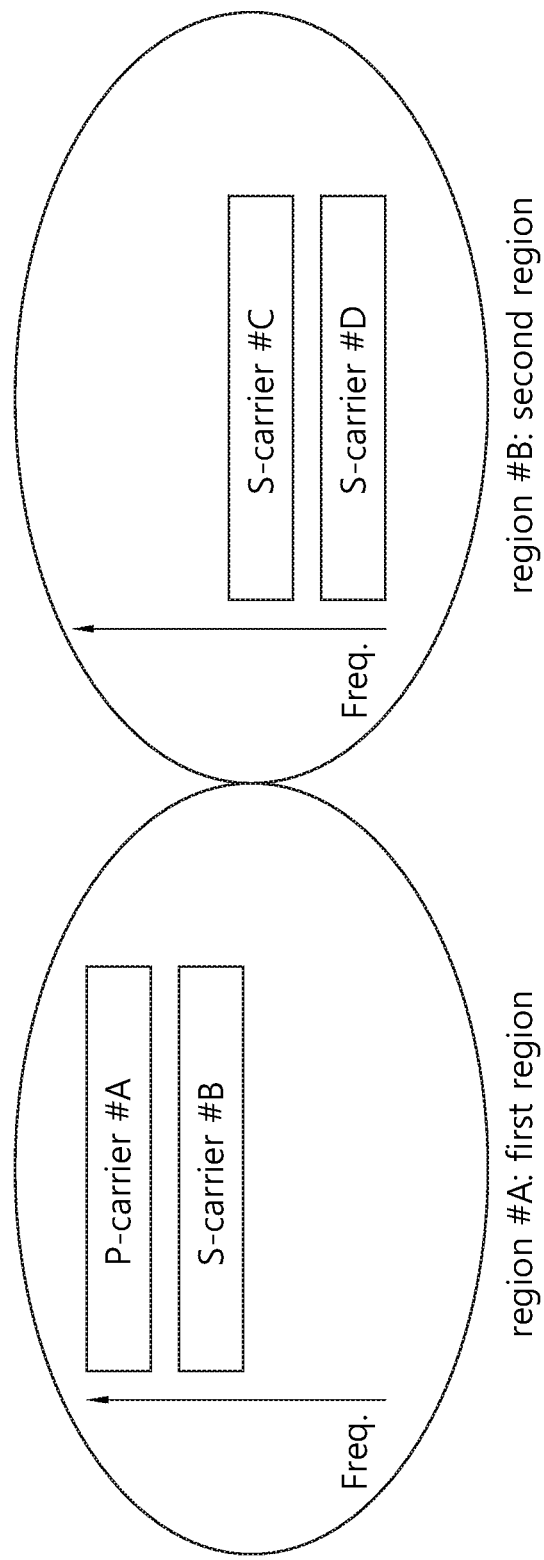
FIG. 8 shows an example of configuring a carrier for each region according to the rule#B.

FIG. 8 shows an example of configuring a carrier for each region according to the rule#B.

Referring to FIG. 8, the P-carrier#A and the S-carrier#B may be configured in the region#A. The S-carrier#C and an S-carrier#D may be configured in the region#B. In this case, it may be configured such that TX/RX of both a V2X control signal and V2X data is allowed in the region#A through the P-carrier#A, and TX/RX of both the V2X control signal and the V2X data is allowed in the region#B only through the S-carrier#C. It may be configured such that only the V2X data TX/RX is allowed through the S-carrier#B and the S-carrier#D. The P-carrier#A, the S-carrier#B, the S-carrier#C, and the S-carrier#D may be carriers of different bands. Although it is represented as a carrier in FIG. 8 for convenience of explanation, the carrier may also be represented as a cell.

For example, when the rule#B is applied, a V2X entity, e.g., a V-UE or a P-UE, may monitor a carrier(/cell) related to V2X control/data message RX/TX of a region to which it belongs (e.g., the P-carrier(/cell)#A and/or the S-carrier(/cell)#B (region#A), the S-carrier(/cell)#C (and/or the S-carrier(/cell)#D (region#B))) either 'periodically according to a predefined or signaled period value' or 'preferentially'.

When a V2X TX entity is located at a boundary of a different (or adjacent) region or passes the boundary of the different (or adjacent) region, it may be configured such that a V2X (control/data) message TX operation can be performed not only on a (V2X control/data message TX/RX) carrier(/cell) related to the (existing) region to which it belongs but also on a (V2X control/data message TX/RX) carrier(/cell) related to the adjacent (or different) region.

As another example, it may be configured such that a V2X RX entity is allowed to monitor not only a (V2X control/data message RX/TX) carrier(/cell) related to the region to which it belongs but also a (V2X control/data message RX/TX) carrier(/cell) related to the adjacent (or different) region 'periodically according to a predefined or signaled period value'.

Figure 9:
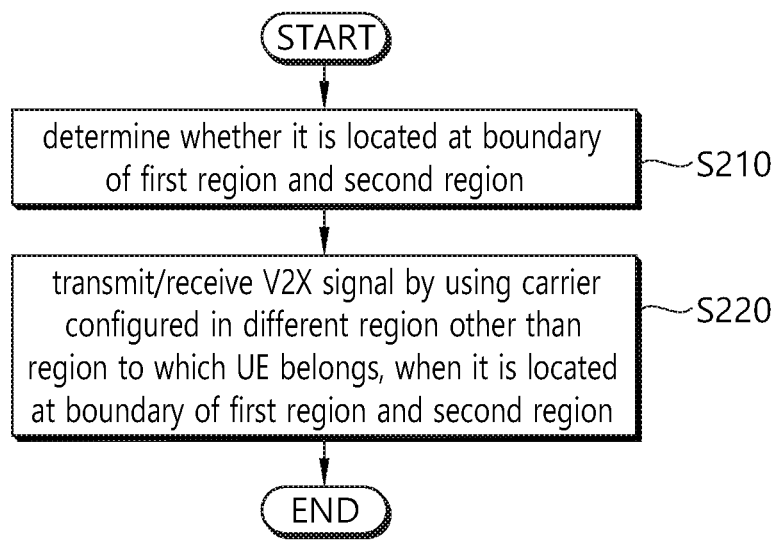
FIG. 9 shows a method of transmitting/receiving a V2X signal of a UE according to another embodiment of the present invention.

FIG. 9 shows a method of transmitting/receiving a V2X signal of a UE according to another embodiment of the present invention.

Referring to FIG. 9, the UE determines whether it is located at a boundary between a first region and a second region (S210).

If the UE is located at the boundary between the first region and the second region, the UE transmits/receives the V2X signal by using a carrier configured in a region other than the region to which it belongs (S220).

When the above methods are applied, even if a carrier/cell related to both V2X control/data message TX/RX is configured independently (or differently) between different (or adjacent) regions, V2X communication(s) related to the different (or adjacent) regions may be continuously or efficiently performed.

When the aforementioned some or all rules (e.g., the rule#A, the rule#B) are applied, if a predefined or signaled V2X control/data message (referred to as 'HP_RXMSG') having a relatively higher priority is received on a V2X control/data message RX carrier(/cell) related to a region to which it belongs (or the predefined or signaled V2X control/data message (referred to as 'HP_TXMSG') having a relatively higher priority is received on a V2X control/data message TX carrier(/cell) related to a region to which it belongs), a V2X entity (e.g., a V-UE, a P-UE) may be allowed not to perform an operation of receiving (or transmitting) the V2X control/data message having a relatively lower priority (than HP_RXMSG (or HP_TXMSG)) on the V2X control/data message RX carrier(/cell) related to the adjacent (or different) region (or a 'RX chain switching' (or 'TX chain switching') operation for receiving (or transmitting) the V2X control/data message having the relatively lower priority).

Such a rule may be configured to be limitedly applied only to a V2X RX(/TX) entity in which the number of carriers/cells configured for the purpose of V2X control/data message RX(/TX) is greater than its own 'RX chain capability' (or 'TX chain capability'). Hereinafter, such an entity may be referred to as a 'limited capability V2X entity', more specifically, a 'limited RX capability V2X entity' or a 'limited TX capability V2X entity'.

The applying of the aforementioned rule may be interpreted that if a predefined (or signaled) V2X control(/data) message having a relatively higher priority is received on a specific carrier(/cell) (configured for the purpose of V2X control(/data) message RX(/TX)), a specific V2X RX(/TX) entity does not perform an operation of receiving (or transmitting) the V2X control/data message having the relatively lower priority on a different (V2X control(/data) message RX(/TX)) carrier(/cell) (or a 'RX chain switching' (or 'TX chain switching') operation for receiving (or transmitting) the V2X control/data message having the relatively lower priority).

For example, when the rule#B and/or the rule#A are applied, if a 'limited TX(/RX) capability V2X entity' has to (simultaneously) transmit(/receive) the V2X control(/data) message not only on a V2X control(/data) message TX(/RX) carrier(/cell) related to a region (region#A) to which it belongs but also on a V2X control(/data) message TX(/RX) carrier(/cell) related to an adjacent (or different) region (region#B), it may be configured to be performed in a 'TDM' manner by considering a 'TX(/RX) chain switching time' (or a 'carrier switching time').

Figure 10:
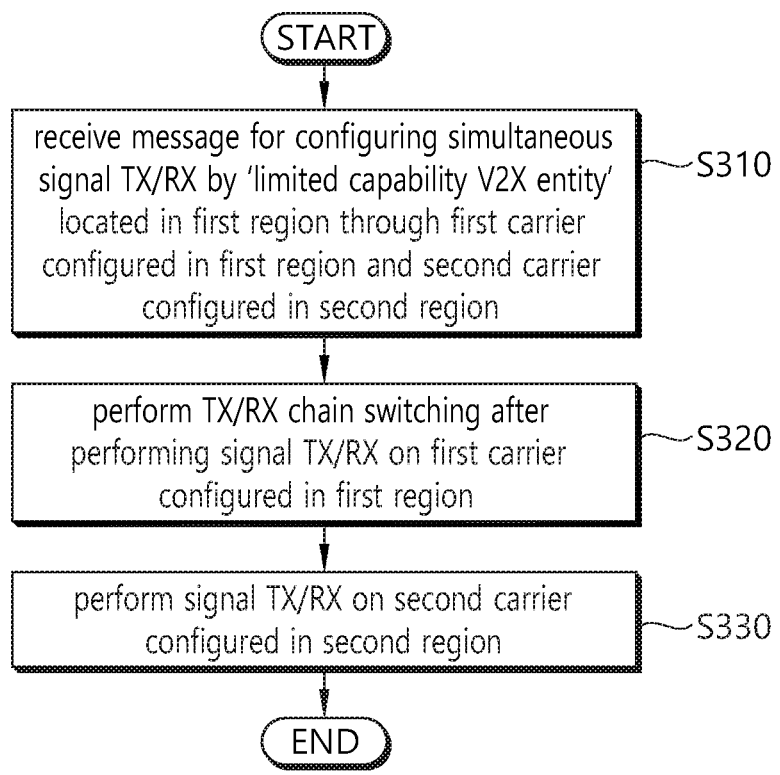
FIG. 10 shows an example of a method operated when a V2X entity having limited capability receives a message for configuring simultaneous signal TX/RX on different carriers.

FIG. 10 shows an example of a method operated when a V2X entity having limited capability receives a message for configuring simultaneous signal TX/RX on different carriers.

Referring to FIG. 10, a 'limited capability V2X entity' located in a first region may receive a message for configuring simultaneous TX/RX of a signal through a first carrier configured in the first region and a second carrier configured in a second region (S310).

The V2X entity having limited capability performs TX/RX chain switching after performing signal TX/RX on the first carrier configured in the first region (S320).

The V2X entity having limited capability performs signal TX/RX on the second carrier configured in the second region (S330).

Such a rule may be configured to be limitedly applied only when the 'limited TX(/RX) capability V2X entity' is located at a boundary of a different (or adjacent) region (or when it passes the boundary of the different (or adjacent) region).

On the other hand, when the rule#B and/or the rule#A are applied, if a V2X TX(/RX) entity having 'multiple-V2X TX(/RX) carrier TX(/RX) capability' has to (simultaneously) transmit(/receive) a V2X control(/data) message not only on a V2X control(/data) message TX(/RX) carrier(/cell) (referred to as 'ORI_TXCC') related to a region (region#A) to which it belongs but also a V2X control(/data) message TX(/RX) carrier(/cell) (referred to as 'NEG_TXCC') related to an adjacent (or different) region (region#B), it may be configured to perform simultaneous TX(/RX) on the ORI_TXCC and the NEG_TXCC instead of performing it in a 'TDM' manner.

Figure 11:
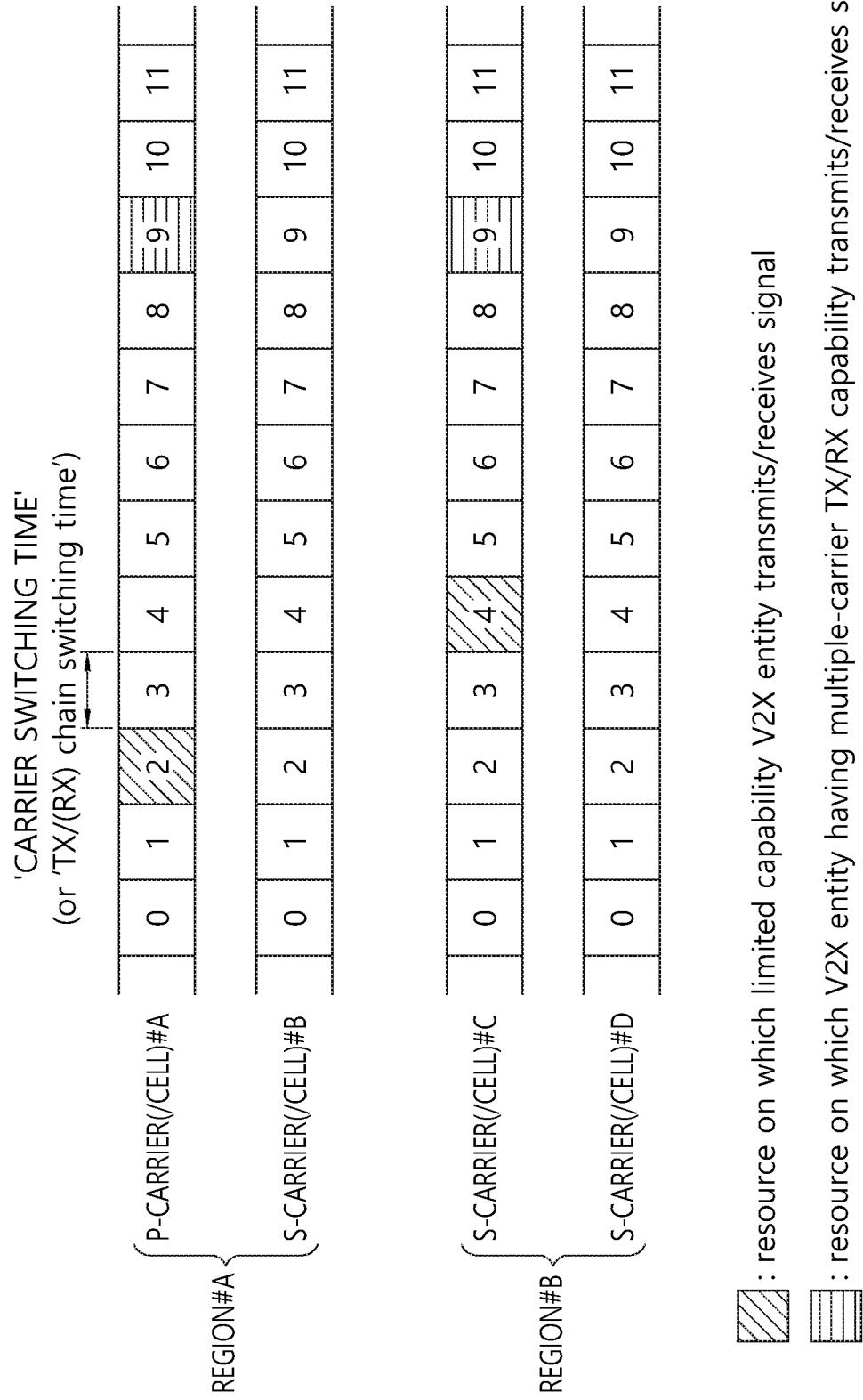
FIG. 11 is a drawing for comparing an operation of a V2X entity having limited capability and an operation of a V2X entity having multiple-carrier TX(/RX) capability.

FIG. 11 is a drawing for comparing an operation of a V2X entity having limited capability and an operation of a V2X entity having multiple-carrier TX(/RX) capability.

Referring to FIG. 11, a P-carrier(/cell)#A and S-carrier(/cell)#B related to V2X control(/data) message TX(/RX) may be configured in a region#A, and an S-carrier(/cell)#C and S-carrier(/cell)#D related to V2X control(/data) message TX(/RX) may be configured in a region#B.

For example, a V2X entity having limited capability may operate in a TDM manner, whereas a V2X entity having multiple-carrier TX(/RX) capability may perform simultaneous transmission, when a message configured to transmit a V2X signal simultaneously through a carrier(/cell) to which it belongs and a carrier(/cell) of an adjacent different region. That is, the V2X entity having limited capability transmits a signal in a subframe #2 of the P-carrier(/cell)#A, performs carrier switching (assumed as 1 ms, and also referred to as TX chain switching), and thereafter transmits a V2X signal through a subframe #4 of the S-carrier(/cell) #C. On the other hand, the V2X entity having multiple-carrier TX(/RX) capability may simultaneously transmit a V2X signal through a subframe#9 of the S-carrier(/cell)#C while transmitting a signal in a subframe#9 of the P-carrier (/cell)#A. Such an operation is also equally applied in case of reception.

On the other hand, a V2X entity for performing a V2X control/data message TX operation on a specific carrier(/cell) (referred to as 'CONGEST_CC') configured for the purpose of V2X control/data message TX may be instructed to allow a predefined (LTE) serving BS (or an Internet transaction server (ITS) server or a V2X function) to move (/switch) only the V2X data(/control) message TX operation to another carrier(/cell) (configured for the purpose of V2X data(/control) message TX), in order to mitigate a 'congestion(noad) level' related to the CONGEST_CC.

Alternatively, the operation of moving(/switching) the carrier(/cell) related to the V2X data(/control) message TX may be configured to be performed in the order of a predefined or signaled carrier(/cell) movement(/switching) if a recognized 'congestion(noad) level' is higher than a predefined or signaled threshold, after directly recognizing the 'congestion(noad) level' of the CONGEST_CC by using an energy detection operation or the like.

When only the 'V2X data message' TX operation is moved(/switched) to another carrier(/cell) (referred to as 'DATASW_CC'), a 'carrier(kell) indication field' for informing a specific carrier(/cell) on which 'V2X data message' TX is performed in association with corresponding control(/scheduling) information may be included in a 'V2X control message' transmitted on the CONGEST_CC.

A size of a 'resource allocation field' of the 'V2X control message' transmitted on the CONGEST_CC may be set to be determined according to a relatively greater (or smaller) value between a 'system bandwidth (related to V2X communication) of the CONGEST_CC' and a 'system band (related to V2X communication) of DATASW_CC'.

On the other hand, when the proposed rules (e.g., rule#A, rule#B) are applied, a P-UE(s) may be configured to perform an operation of monitoring a V2X (control/data) message on a V2X (control/data) message RX carrier(/cell) related to a region to which it belongs and/or a V2X (control/data) message RX carrier(/cell) related to an adjacent (or different) region only when a predefined indicator (referred to as 'NGMONI_INDI') is received from an (LTE) serving BS (or RSU) of a region to which it belongs (or may be configured to perform the operation of monitoring the V2X (control/data) message on the V2X (control/data) message RX carrier (/cell) related to a region to which it belongs and/or the V2X (control/data) message RX carrier(/cell) related to the adjacent (or different) region periodically according to a predefined or signaled period value).

When the proposed rules (e.g., rule#A, rule#B) are applied, in order to decrease a 'congestion(noad) level' (referred to as 'HCG_CC') of a specific carrier(/cell) (configured for the purpose of V2X control/data message TX), a predefined (LTE) serving BS (or an ITS server or a V2X function) may instruct a 'limited TX capability V2X entity' to move (switch) only a V2X data message TX operation (in the HCG_CC).

The operation of moving(/switching) the carrier(/cell) related to the V2X data message TX may be configured to be performed in the order of a predefined or signaled carrier(/cell) movement(/switching) if a recognized 'congestion(noad) level' is higher than a predefined or signaled threshold, after directly recognizing the 'congestion(noad) level' of the HCG_CC by using an energy detection operation or the like.

Figure 12:
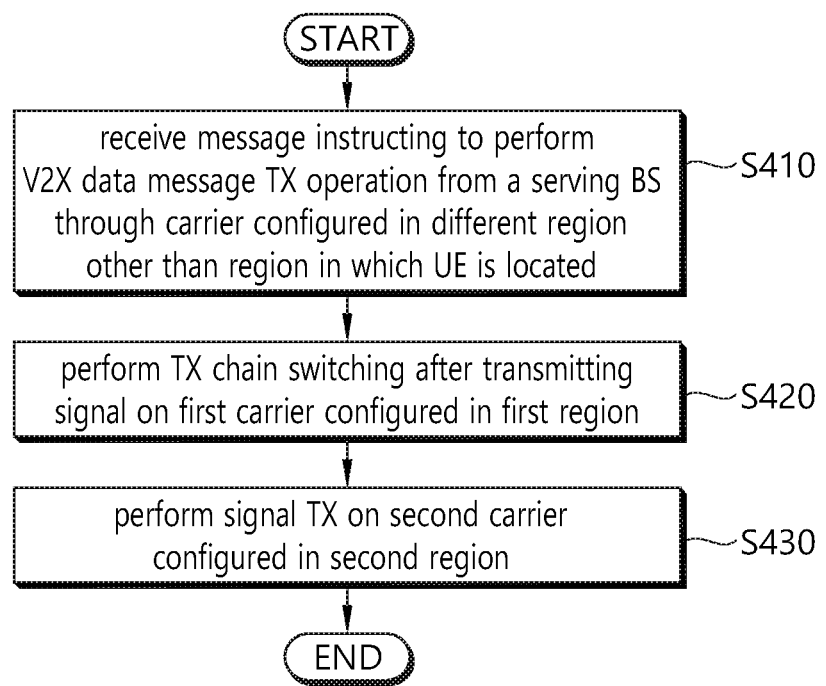
FIG. 12 shows an example of an operation of a UE for decreasing congestion of V2X signal transmission.

FIG. 12 shows an example of an operation of a UE for decreasing congestion of V2X signal transmission.

Referring to FIG. 12, a message of instructing to perform a V2X data message TX operation may be received from a serving BS through a carrier configured in a region other than a region in which the UE is located (S410).

The UE may perform TX chain switching after transmitting a signal on a first carrier configured in a first region (S420), and may perform signal transmission on a second carrier configured in a second region (S430).

Figure 13:
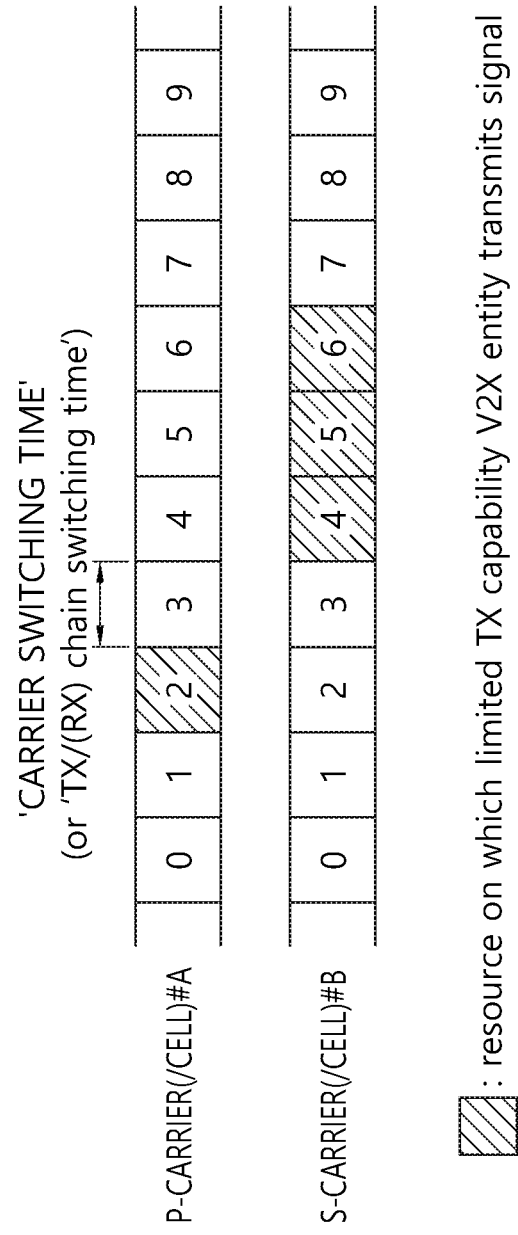
FIG. 13 shows an example of a resource on which a V2X entity having limited capability transmits a signal according to the method of FIG. 12.

FIG. 13 shows an example of a resource on which a V2X entity having limited capability transmits a signal according to the method of FIG. 12.

Referring to FIG. 13, while transmitting a V2X signal in a subframe #2 of a P-carrier(/cell)#A, the V2X entity having limited TX capability may be instructed to perform an operation of transmitting a V2X signal on an S-carrier(/cell)#B to decrease a congestion/load level of the P-carrier(/cell)#A from a serving cell. A field indicating the S-carrier(/cell)#B may be included in the instruction. The V2X entity may transmit the V2X signal in subframes #4, 5, and 6 of the S-carrier(/cell)#B after carrier switching (TX chain switching).

Specifically, a V2X control message is transmitted in the subframe #2 of the P-carrier(/cell). The V2X control message may include scheduling information regarding: (A) a 'V2X data message transmitted (together with a V2X control message) in the subframe #2 of the P-carrier(/cell)#A'; and (B) a 'V2X data message transmitted in the subframe #4, subframe #5, and subframe #6 of the S-carrier(/cell)#B'. It is assumed that a 'TX(/RX) chain switching time' (or a 'carrier switching time') is '1 ms'.

In FIG. 13, a V2X entity not having RX capability for the S-carrier(/cell)#B receives only a 'V2X control message and V2X data message transmitted in the subframe #2 of the P-carrier(/cell)#A', and a V2X entity having RX capability for the S-carrier(/cell)#B may receive not only the 'V2X control message transmitted in the subframe #2 of the P-carrier(/cell)#A' but also a 'V2X control message transmitted in the subframe #4, subframe #5, and the subframe #6 of the S-carrier(/cell)#B'. That is, V2X message RX performance may be improved in comparison with the V2X entity not having RX capability for the S-carrier(/cell)#B.

When the proposed rules (e.g., rule#A, rule#B) are applied, if the 'limited RX capability V2X entity' recognizes (/detects) that a different V2X entity (V2X entity#B) having a relatively higher priority transmits a V2X message on a different carrier(/cell) (e.g., S-carrier(/cell)#B) (configured for the purpose of V2X control/data message RX) while receiving a V2X message related to a specific V2X entity (V2X entity#A) on a specific carrier(/cell) (e.g., P-carrier(/cell)#A) (configured for the purpose of V2X control/data message RX), it may be configured to receive a V2X message transmitted by the different V2X entity (V2X entity#B) having the relatively higher priority after performing a 'RX chain switching' (or 'carrier switching') operation.

The V2X entity having the relatively higher priority may be configured to transmit a predefined or signaled V2X message having a relatively higher priority (e.g., a 'message for informing emergency situation occurrence' may have a higher priority than a 'location information transmission message', and an 'event triggered message (e.g., DENM)' may have a higher priority than a 'periodic message (e.g., CAM)'). Alternatively, it may be configured as a predefined or signaled V2X entity having a relatively higher priority in terms of a priority of V2X message RX (e.g., an 'RSU' may have a higher priority than a 'V-UE').

When the proposed rules (e.g., rule#A, rule#B) are applied, if a 'limited RX capability V2X entity' recognizes (/detects) that the different V2X message having the relatively higher priority is transmitted on a different carrier(/cell) (e.g., S-carrier(/cell)#B) (configured for the purpose of V2X control/data message RX) while receiving a specific V2X message on a specific carrier(/cell) (e.g., P-carrier(/cell)#A) (configured for the purpose of V2X control/data message RX), the proposed methods may be extended to receive a different V2X message having a relatively higher priority after performing a RX chain switching (or 'carrier switching') operation.

Figure 14:
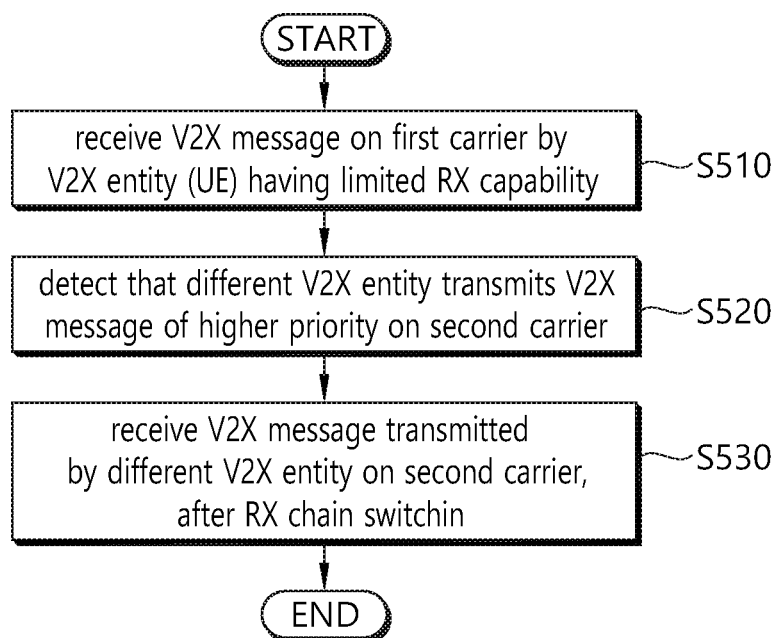
FIG. 14 shows an example of a method of operating a V2X entity having limited RX capability.

FIG. 14 shows an example of a method of operating a V2X entity having limited RX capability.

Referring to FIG. 14, a V2X entity (UE) having limited RX capability may receive a V2X message on a first carrier (S510). The V2X entity (UE) having limited RX capability may detect that a different V2X entity transmits a V2X message having a higher priority on a second carrier (S520). After RX chain switching, the V2X entity receives a V2X message transmitted by the different V2X entity on the second carrier (S530).

Figure 15:
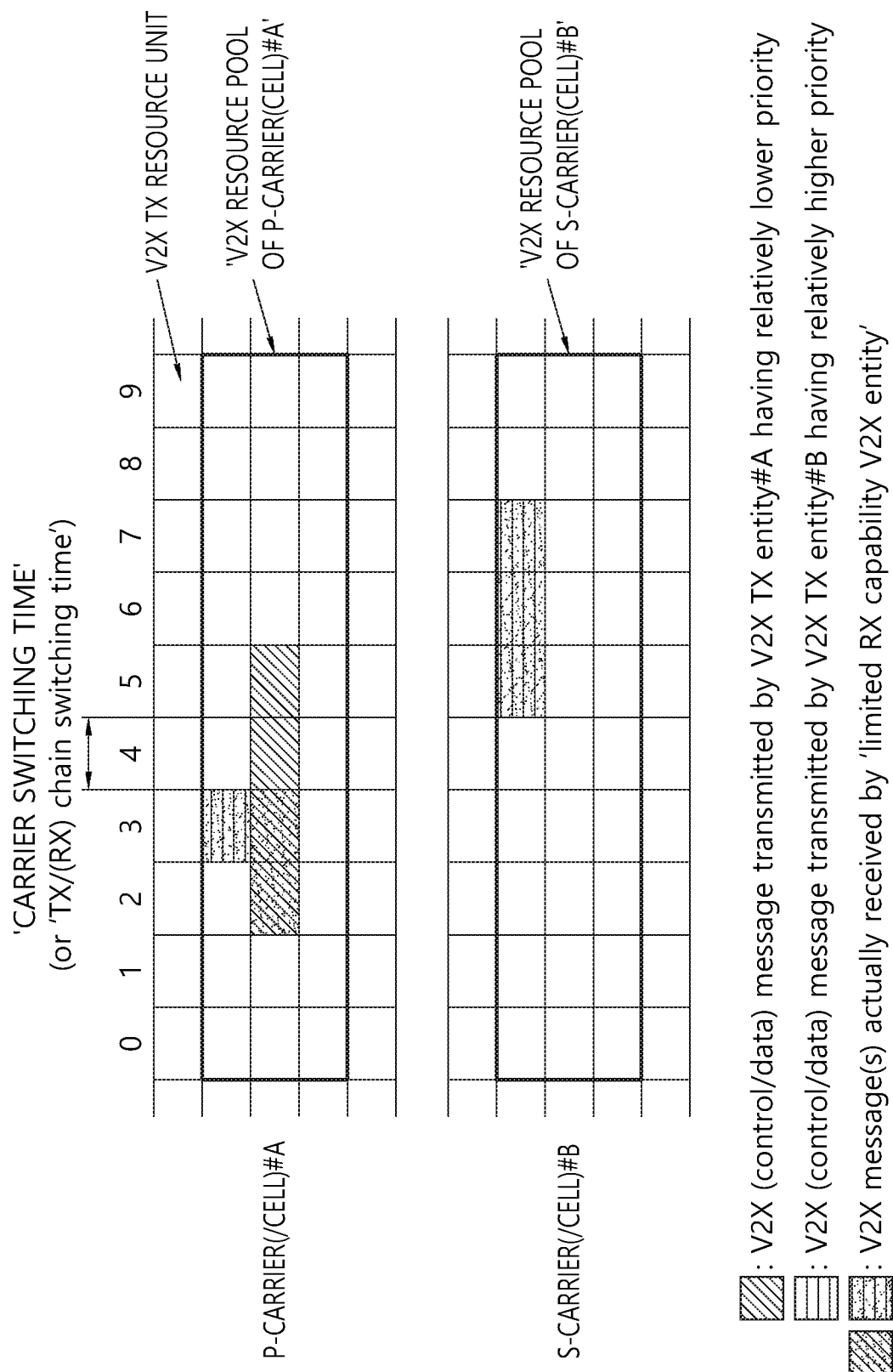
FIG. 15 shows an example of a method of operating a V2X entity having limited RX capability when the method of FIG. 14 is applied.

FIG. 15 shows an example of a method of operating a V2X entity having limited RX capability when the method of FIG. 14 is applied.

Referring to FIG. 15, a 'limited RX capability V2X entity (referred to as a V2X entity#C)' may recognize that a 'V2X (control/data) message related to a different V2X entity#B having a relatively higher priority' is transmitted on a subframe #5, subframe #6, and subframe #7 of a different S-carrier(/cell)#B (configured for the purpose of V2X control/data message RX) by receiving(/detecting) a V2X (control(/data)) message transmitted by a V2X entity#B in a subframe #3 of a P-carrier(/cell)#A while receiving a 'V2X (control/data) message related to a V2X entity#A having a relatively lower priority' on a subframe #2 and subframe #3 of a specific P-carrier(/cell)#A (configured for V2X control/data message RX). Then, the limited RX capability V2X entity (V2X entity#C) receives a V2X (data(/control)) message transmitted by the different V2X entity#B having the relatively higher priority after performing a RX chain switching (or 'carrier switching') operation (under the assumption that a 'TX(/RX) chain switching time' (or a 'carrier switching time') is '1 ms').

Therefore, a V2X message actually received by the limited RX capability V2X entity (V2X entity#C) corresponds to a subframe #2 and subframe #3 of the P-carrier(/cell)#A and a subframe #5, subframe #6, and subframe #7 of the S-carrier(/cell)#B. In a subframe#4 of the P-carrier(/cell)#A, a V2X (control/data) message related to the V2X entity#A cannot be received due to TX chain switching.

As another example, if the V2X entity having 'limited RX capability' has a plurality of (e.g., 2) RX chains, under the situation of FIG. 15, one (dedicated) RX chain may be allocated to the P-carrier(/cell)#A to (continuously) receive a V2X message (the subframe #2, subframe #3, subframe #4, and subframe #5 of the P-carrier(/cell)#A) transmitted by the V2X entity#A and a V2X message (the subframe #3 of the P-carrier(/cell)#A) transmitted by the V2X entity#B, and the remaining one RX chain may be allocated to the S-carrier(/cell)#B (or the remaining carrier(/cell) configured for the purpose of V2X control(/data) message RX) (through a RX chain switching (or carrier switching) operation) to receive a V2X message (the subframe #5, subframe #6, and the subframe #7 of the S-carrier(/cell)#B) transmitted by the V2X entity#B.

Examples for the aforementioned proposed method can be included as one of implementation methods of the present invention, and thus can be apparently regarded as a sort of proposed methods. In addition, although the aforementioned proposed methods can be independently implemented, it is also possible to be implemented by combining (or merging) some proposed methods. For example, although the proposed method is described on the basis of a 3GPP LTE/LTE-A system for convenience of explanation, a system to which the proposed method is applied can also be extended to another system other than the 3GPP LTE system. For example, the proposed methods of the present invention can also be extendedly applied for D2D communication. Herein, the D2D communication implies that a UE communicates with a different UE directly by using a radio channel. For example, although the UE implies a user terminal, when a network device such as a BS transmits/receives a signal according to a communication scheme between UEs, the UE may also be regarded as a sort of the UE.

Figure 16:
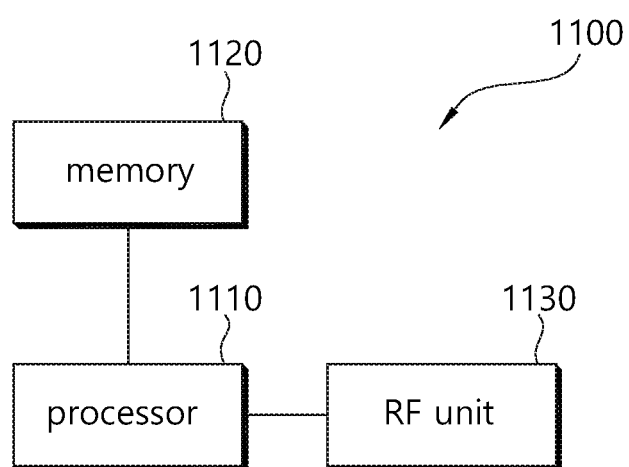
FIG. 16 is a block diagram illustrating the user device in which an embodiment of the present invention is implemented.

FIG. 16 is a block diagram of a UE according to an embodiment of the present invention.

Referring to FIG. 16, a UE 110 includes a processor 1110, a memory 1120, and a radio frequency (RF) unit 1130. The processor 1110 implements the proposed function, procedure, and/or method.

The RF unit 1130 is connected to the processor 1110 to transmit and receive radio signals.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method of transmitting or receiving a vehicle-to-everything (V2X) signal by a terminal in a wireless communication system, the terminal being positioned on a boundary between a first region and a second region, the method comprising:
    transmitting or receiving a V2X control signal through a first carrier configured commonly in the first region and the second region; and
    transmitting or receiving V2X data through a second carrier configured in the first region or a third carrier configured in the second region based on scheduling information,
    wherein the V2X control signal includes the scheduling information for the V2X data being transmitted or received through each of the second carrier and the third carrier,
    wherein based on a congestion level, related to a specific carrier between the second carrier and the third carrier, being higher than a threshold, the terminal transmits a specific V2X data, which is configured to be transmitted through the specific carrier by the scheduling information, through the other carrier, and
    wherein the specific V2X data transmitted through the other carrier has a higher priority than the V2X data other than the specific V2X data.

2. The method of claim 1, wherein the first region and the second region are adjacent different geographical regions.

3. The method of claim 1, wherein the first carrier is a carrier configured to allow both the V2X control signal transmission or reception and the V2X data transmission or reception.

4. The method of claim 3, wherein each of the second carrier and the third carrier is a carrier configured to allow only the V2X data transmission or reception.

5. The method of claim 1, wherein the terminal is a limited capability terminal having a smaller number of transmission chains or reception chains than the number of carriers configured in the first region and the second region.

6. The method of claim 5, wherein based on the terminal receiving a message configured to simultaneously transmit V2X signals through the first carrier and the third carrier, the V2X signal is transmitted through the first carrier and thereafter the transmission chain changes, and the V2X signal is transmitted through the third carrier.

7. The method of claim 5, wherein based on the terminal receiving a message configured to simultaneously receive V2X signals through the first carrier and the third carrier, the V2X signal is received through the first carrier and thereafter the reception chain changes, and the V2X signal is received through the third carrier.

8. The method of claim 1, further comprising, based on a complexity of a carrier on which the terminal performs a V2X signal transmission operation is being greater than or equal to a threshold, receiving a message for instructing to perform the V2X signal transmission operation on a different carrier.

9. The method of claim 1, wherein upon detecting that a different terminal is transmitting a V2X signal, which has a higher priority than the V2X signal of the specific carrier, on the different carrier while the terminal is receiving the V2X signal in a specific carrier, a V2X signal having a higher priority is received on the different carrier after reception chain switching.

10. The method of claim 1, wherein each of the first carrier, the second carrier and the third carrier has a different frequency band.

11. The method of claim 1, wherein the scheduling information is used for scheduling the V2X data being transmitted or received through each of the second carrier and the third carrier.

12. The method of claim 1, wherein an event triggered V2X data has a higher priority than a periodic V2X data.

13. The method of claim 1, wherein a public safety related V2X data has a higher priority than a non-public safety related V2X data.

14. A terminal for transmitting and receiving a vehicle-to-everything (V2X) signal, the terminal being positioned on a boundary between a first region and a second region, the terminal comprising:

a transceiver transmitting and receiving a radio signal; and a processor operably coupled to the transceiver, wherein the processor is configured to:

transmit or receive a V2X control signal through a first carrier configured commonly in the first region and the second region; and transmit or receive V2X data through a second carrier configured in the first region or a third carrier configured in the second region based on scheduling information, wherein the V2X control signal includes the scheduling information for the V2X data being transmitted or received through each of the second carrier and the third carrier, wherein based on a congestion level, related to a specific carrier between the second carrier and the third carrier, being higher than a threshold, the terminal transmits a specific V2X data, which is configured to be transmitted through the specific carrier by the scheduling information, through the other carrier, and wherein the specific V2X data transmitted through the other carrier has a higher priority than the V2X data other than the specific V2X data.

* * * * *